Oct. 22, 1935.  P. M. BOURDON  2,018,597
SUPPORT OR MOUNTING FOR PNEUMATIC TIRES
Filed Dec. 14, 1931
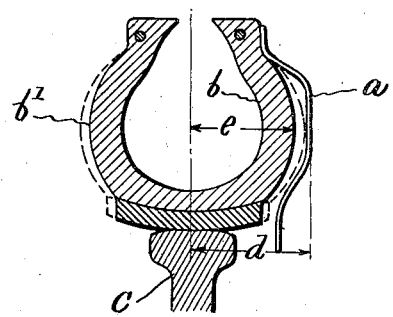
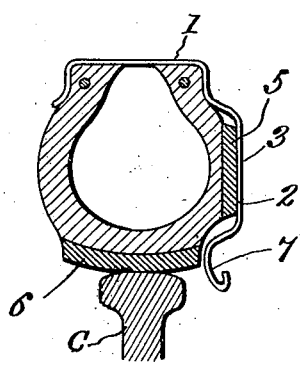 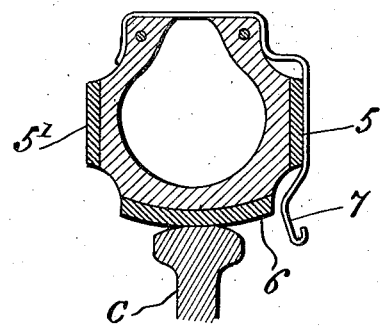
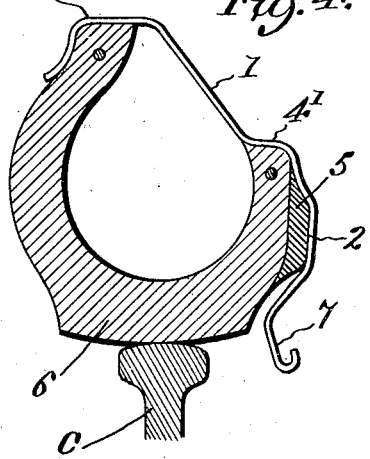 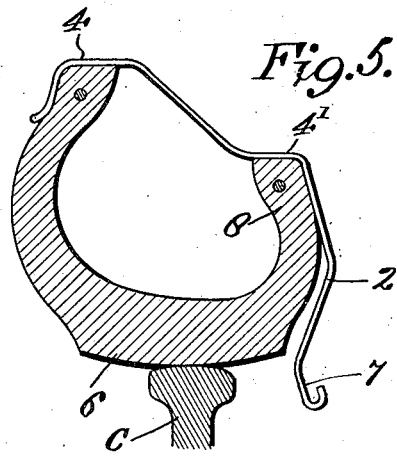
Inventor
Pierre Marcel Bourdon
By Wilkinson & Mawhinney
Attorneys Patented Oct. 22, 1935

2,018,597

UNITED STATES PATENT OFFICE 2,018,597

SUPPORT OR MOUNTING FOR PNEUMATIC TIRES

Pierre Marcel Bourdon, Paris, France, assignor to Michelin et Cie, Clermont-Ferrand, France, a corporation of France Application December 14, 1931, Serial No. 580,961
In France March 23, 1931

2 Claims. (Cl. 295—31)

The present invention relates to improvements in supports or mountings for pneumatic tires particularly on railway vehicles, and has for an object to provide an improved mounting or supporting device which will reinforce and sustain the tire and prevent excessive lateral deformation thereof particularly when rounding sharp curves.

Another object of the invention is to accomplish these purposes without undue friction upon the tire wall and without undue wear of the tire.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a vertical section taken through a railway vehicle tire shown as engaging a portion of the rail according to the prior construction.

Figure 2 is a similar view showing one form of the invention.

Figures 3, 4 and 5 are similar views showing modified forms of the invention.

Referring first to Figure 1, in railway vehicles, as at the present time constructed, there is found a side member $a$ designed to prevent the excessive lateral deformation of the pneumatic tire during the movements of the vehicle on zig-zag or curved roads such as are common in the mountains. This side member $a$ has always been spaced at a distance from the side wall $b$ of the pneumatic tire or casing. This spaced relation obtains normally. There is contact of the tire wall $b$ with the side member $a$ under exceptional conditions, such as the abnormal lateral deflection or deformation of the tire, as indicated in dotted lines.

Due to this spaced relation the tire supports the entire weight of the vehicle and sustains shocks, jars and other reactions from the rails $c$ without any aid from the side member $a$. The letter $d$ represents the distance between the median plane through the tire and rail over to the side member $a$; and the letter $e$ represents the distance between such median plane and the exterior portion of the wall $b$ of the tire. The distance $d$ is governed by the gage or regulations of the railroads as compared with the distance $e$, which distance $e$ is always substantially less than the distance $d$ in order that there may be that spacing between the side wall $b$ of the tire and the side member $a$, leaving the tire entirely free to flex under normal conditions.

According to the invention it is proposed to provide a continuous support between the side wall of the tire $b$ and the side member $a$ instead of having only the intermittent engagement possible under the old construction; and at the same time to permit just as free flexing of the tire.

In this way there is a continuous support between the casing of the tire and the side member $a$. That support may be secured in various ways, for instance, by extending the tire wall over to the member $a$, or by inserting a separate member or pad in the space between the tire casing and member $a$ which pad is to be carried either by the side wall of the tire $b$ or by the side member $a$.

The principal advantages of such construction are as follows:—

It takes up the play between the tire $b$ and the side member $a$; it permits of increasing the cross sectional area of the air chamber within the tire thus allowing for the carrying of lower pressures; it affords a better support with less wear and tear and various other advantages.

Referring more particularly to Figure 2, 1 designates the rim on which the tire is mounted, and 2 represents a modified form of side member which is an extension of one of the flanges of the rim 1. Between this side member 2 and the wall of the tire is interposed a pad or support 5 of reinforced rubber or other appropriate material. Such pad or support 5 may be carried by the tire or by the side member 2. If desired the side member 2 may be provided with an appropriate lining, for example hard steel. Preferably such side member will in all cases be polished and dressed in such a manner as to reduce the wear and tear due to the flexing of the tire. The tread band of the tire is indicated at 6 and travels on the rail head $c$. The side member 2 is extended in a radially outward direction to provide a flange or guide member 7 which will tend to keep the tire on the rail $c$. The pad or support 5 is preferably of rubber or some elastic or compressible substance in order to take up firmly the space between the side wall of the tire and the side member 2 but at the same time not to interfere with the free flexing of the tire, the rubber pad 5 being compressible and subject to elongation or distortion. The member 2 may also have a limited flexibility.

Referring more particularly to Figure 3 there is here shown a modification of the device in which the tire casing carries two pads or supports 5 and 5', one at each side wall of the tire and upon the outside of the same. This construction permits the tire to be put upon the rim from either side and does not require any attention and care on the part of the attendant to put the tire upon the rim with the one pad against the side member. In other words, the tire is in this case reversible upon the rim.

Referring more particularly to Figure 4 a portion of one of the side walls and beads of the tire is removed or shortened and the rim 1 is oblique so that the bead seats 4 and 4' of the rim are offset radially from one another. The bead seat 4' is situated immediately adjacent the support 5 for the side wall of the tire.

Referring more particularly to Figure 5 a very similar form of the invention is shown in which a portion of one side of the tire is removed or cut away; but in this instance the pad or support is done away with and the side wall of the tire 8 is directly supported by the side member 2 which may be a part of the rim.

In this instance the outer bead seat 4' of the rim has an outwardly extending part which will take against a large area of side wall of the part 8 of the casing, thus reinforcing and contacting with the same to secure the same effect as the pad or support 5 in the other views. The side member $a$ supports the side wall $b$ of the pneumatic tire throughout the entire circumference of the latter. That support prevents excessive deformation of the tire and excessive working, heating and friction of the side wall $b$ of the casing and that support opposes the dangerous tendency of the pneumatic tire to leave the rails or peel off the rim at points where the rails are inclined and therefore affords a more limited bearing surface.

The new arrangement also has the effect to automatically center the vehicle upon the rails, as there is a constant reaction of the tire against the side member tending to right the tire into the central vertical position.

As the pressure is constant between the tire and the side member there is an absorbing of shocks and jars which reduces the wear and tear of the side walls of the tire.

It is obvious that various changes and modifications may be made in the details of construction and design of the above specifically described embodiment of this invention without departing from the spirit thereof, such changes and modifications being restricted only by the scope of the following claims.

What is claimed is:—

1. In combination, a rim having integral radially offset seats for a tire with a diagonal portion between the seats, and a tire seated thereon and having radially offset beads received in the seats.

2. In a vehicle tire, a tire casing traveling on a rail, a side member extending alongside the casing and beyond the perimeter of the casing at the side of the rail, and reinforced rubber pads carried in the side walls of the casing and compressibly fitting against said member.

PIERRE MARCEL BOURDON.